(No Model.)
J. SCHÄFER.
CLOSURE OF BOTTLES FOR STERILIZING PURPOSES.
No. 558,848. Patented Apr. 21, 1896.
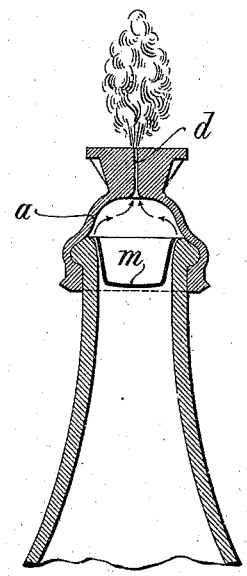
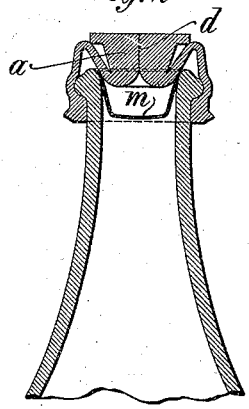

UNITED STATES PATENT OFFICE.

JULIUS SCHÄFER, OF BONN, GERMANY.

CLOSURE OF BOTTLES FOR STERILIZING PURPOSES.

SPECIFICATION forming part of Letters Patent No. 558,848, dated April 21, 1896.

Application filed November 4, 1895. Serial No. 567,929. (No model.) Patented in Germany December 4, 1894, No. 83,300, and in Hungary July 22, 1895, No. 3,270.

*To all whom it may concern:*

Be it known that I, JULIUS SCHÄFER, a subject of the King of Prussia, Emperor of Germany, and a resident of Bonn, Germany, have invented certain new and useful Improvements in Closures of Bottles for Sterilizing Purposes, of which the following is a specification, reference being had to the accompanying drawings.

The invention has been patented in Germany, No. 83,300, dated December 4, 1894, and in Hungary, No. 3,270, dated July 22, 1895.

Hitherto stoppers used for sterilizing purposes consisted of rubber caps which were placed upon the orifice of the bottle. They were provided with a valve kept closed by the outside pressure when the air is rarefied in the bottle, while the vapor generated inside the bottle could freely escape. In such stoppers the rubber comes in immediate contact with the fluid to be sterilized, which gives the same a disagreeable rubber taste.

The object of this invention is to remedy that defect, and it is done by the use of an intermediate stopper inserted in the neck of the bottle and made of a material which can have no effect upon the taste.

The construction of this intermediate stopper is such that, though preventing the contact between the rubber and the fluid, it allows the escape of the vapors generated inside the bottle.

In the drawings, Figures 1 and 2 show sections of bottles containing my improvement. The intermediate stopper is constructed in the shape of a cap $m$, of a tasteless material—as, for instance, tin-foil, parchment, china, or glass. The same is inserted upside down in the neck of the bottle, as shown. It must, however, not be so small as to fall within the bottle.

As can be seen from Fig. 1, the cap $m$ rises when an overpressure is generated in the bottle and allows the formed gases or vapor to escape through the valve-slit $d$ of the rubber cap $a$. As soon, however, as a vacuum is created in the bottle the cap $m$ is pressed down into the neck of the bottle by the rubber cap $a$, Fig. 2, and insulates the contents of the bottle from the said rubber cap.

I claim—

A bottle-stopping device for sterilizing purposes having a rubber cap $a$ provided with a cap $m$ inserted in the neck of the same which allows the escape of the gases generated during the sterilizing period yet is pressed into the neck of the said bottle by the rubber cap $a$ in such a manner during the cooling off, that it safely and perfectly insulates the latter from the contents of the bottle.

In testimony whereof I have hereunto set my hand in the presence of two subscribing witnesses.

JULIUS SCHÄFER.

Witnesses:
SOPHIE NAGEL,
WILLIAM HENRY MADDEN.